United States Patent
Crane

[15] 3,669,163
[45] June 13, 1972

[54] BAND SAW WITH SAWDUST EJECTION MEANS

[72] Inventor: Herbert R. Crane, 6803 Kingsbury Boulevard, Saint Louis, Mo. 63130

[22] Filed: April 15, 1970
[21] Appl. No.: 28,842

[52] U.S. Cl.....................143/157 A, 143/17 B, 143/157 B
[51] Int. Cl................................................B27b 13/02
[58] Field of Search.............143/17 R, 17 B, 29, 30, 157 R, 143/157 A, 157 B, 158, 159 B; 83/201

[56] References Cited

UNITED STATES PATENTS

| | | | |
|---|---|---|---|
| 1,496,035 | 6/1924 | Thomson | 143/157 A |
| 2,236,232 | 3/1941 | Brescka et al. | 143/157 B X |
| 1,218,301 | 3/1917 | Nesbitt | 143/157 A |
| 1,789,569 | 1/1931 | Tannewitz | 143/157 B |

FOREIGN PATENTS OR APPLICATIONS

| 1,108,021 | 1/1956 | France | 143/157 A |
|---|---|---|---|

Primary Examiner—Andrew R. Juhasz
Assistant Examiner—James F. Coan
Attorney—Charles E. Markham

[57] ABSTRACT

A band saw in which vertically spaced wheels driving the band serve as centrifugal impellers and the housing portions enclosing the wheels have volute form, the upper housing portion having a central inlet and an outlet directing air downward to the work area, the lower housing portion including inlet passage means leading from the work area to the central portion thereof, and an outlet remote from the work area directing air and sawdust exteriorly of the housing.

7 Claims, 6 Drawing Figures

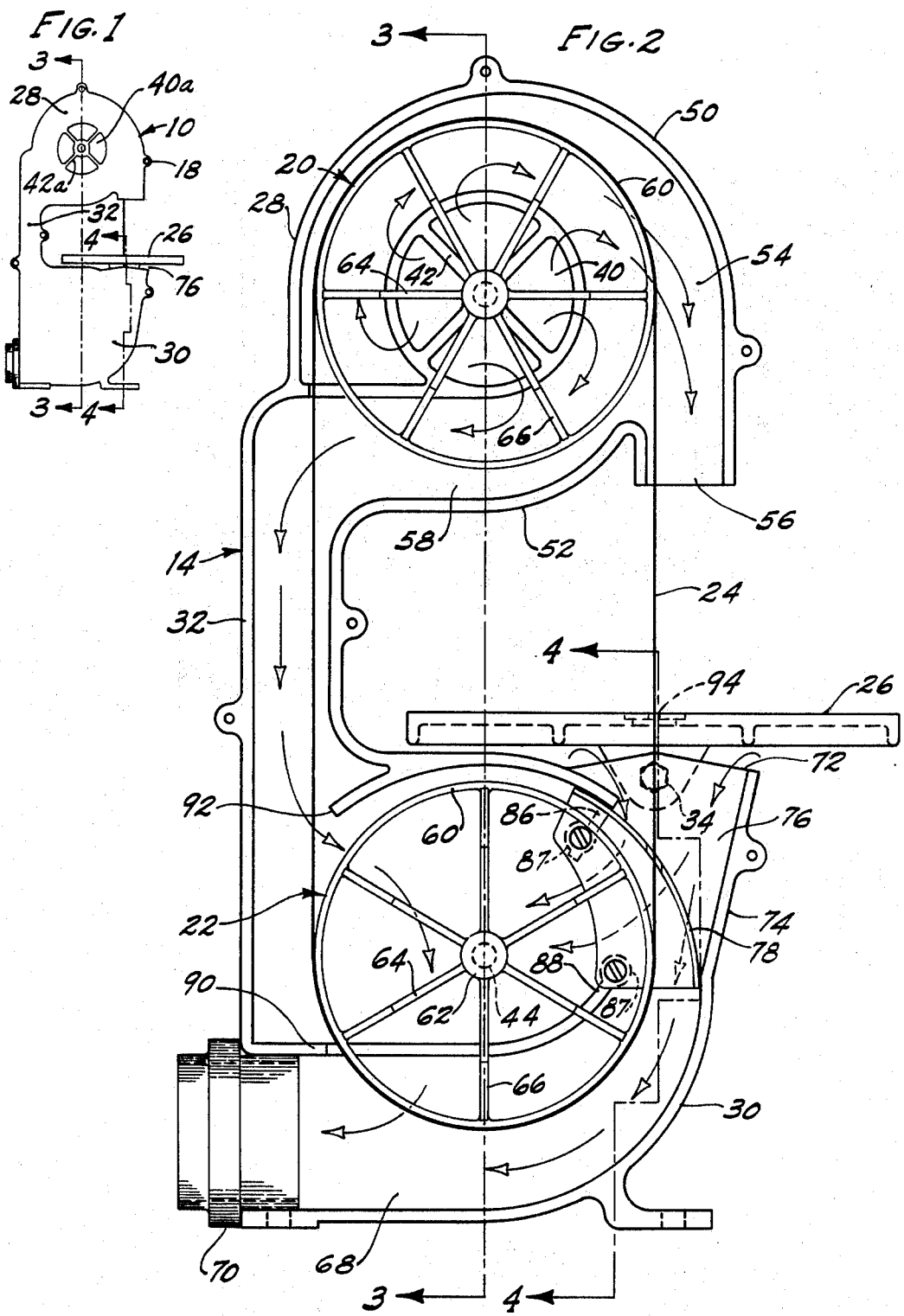

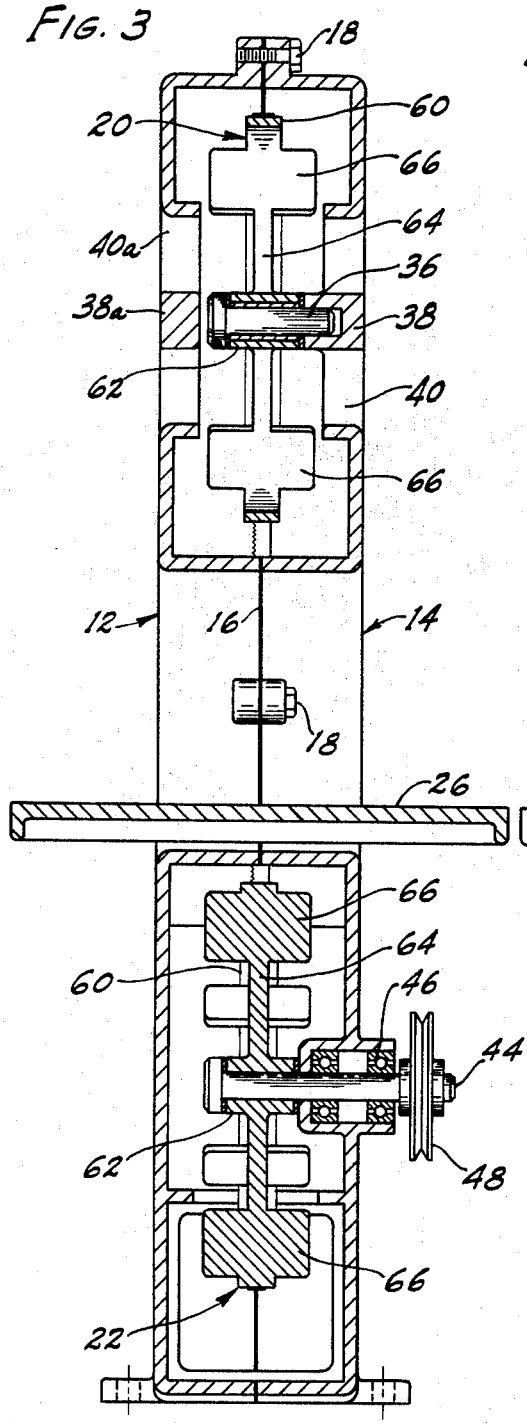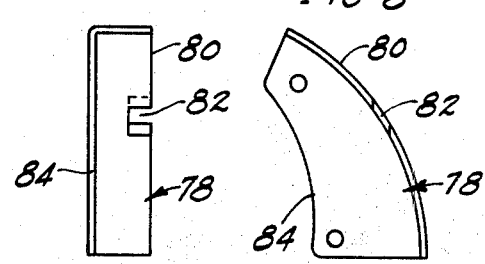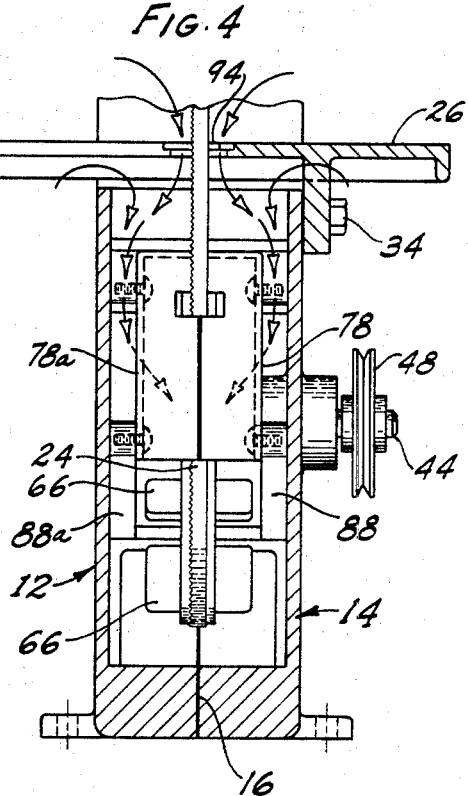

3,669,163

BAND SAW WITH SAWDUST EJECTION MEANS

This invention relates to band saws, and particularly to means for blowing sawdust from the work surface and for withdrawing sawdust from the work area and discharging it exteriorly through a remote opening in the housing.

An object of the invention is to employ the lower driving wheel of a band saw as the impeller of a centrifugal blower, and to form the usual housing structure enclosing the wheel so as to provide a volute casing having a discharge outlet remote from the work area and inlet passage means leading from the work area to the central portion of the volute casing.

A further object is to employ the upper and lower wheels of a vertical band saw as centrifugal impellers and to form the usual housing structure enclosing these wheels so as to provide volute casings, the upper volute casing having a central inlet and a downwardly directed discharge outlet directing air toward the work area, and the lower volute casing including inlet passage means leading from the work area to the central portion thereof, and a discharge outlet remote from the work area whereby sawdust is blown from the work surface, withdrawn from the work area, and ejected from the machine.

A further object is to provide a band saw with sawdust ejection means, as described in the preceding paragraph, which further includes means in the upper housing structure directing a portion of the air flow effected by rotation of the upper wheel downward through the usual hollow housing section connecting the upper and lower housing portions of a vertical band saw, thereby to prevent any upward flow of air and sawdust which may otherwise occur due to rotation of the lower wheel.

A further object is to provide the wheels of a band saw with circularly spaced radial vanes, thereby to more effectively move air radially outward from the central portions thereof.

Further objects and advantages will appear from the following description when read in connection with the accompanying drawings.

In the drawings:

FIG. 1 is a small scale side elevational view of a vertical band saw constructed in accordance with the present invention;

FIG. 2 is an inside elevational view of one half of the band saw housing on which the wheels and worktable are mounted;

FIG. 3 is a vertical cross-sectional view taken along line 3—3 of FIGS. 1 and 2;

FIG. 4 is a fragmentary vertical cross-section showing the lower portion of the band saw and is taken along line 4—4 of FIGS. 1 and 2; and FIGS. 5 and 6 are end and side elevational views, respectively, of one section of the two-section baffle forming an inlet passage in the lower portion of the band saw.

The band saw comprises a housing 10 having left and right-hand, substantially symmetrical sections 12 and 14 joined along a vertical line 16 and rigidly connected by screws 18. The band saw further comprises upper and lower wheels 20 and 22, respectively, an endless saw band 24 extending over the upper and lower wheels, and a worktable 26. The housing 10 further comprises upper and lower portions, designated 28 and 30, which are joined by a hollow vertical portion 32.

The upper and lower wheels 20 and 22 are mounted for rotation in the right-hand housing section 14, and the worktable 26 is mounted on the lower portion of the right-hand housing section 14 for tilting adjustment by a bolt 34. The upper wheel 20 is mounted for rotation on a pin 36 fixed in a hub portion 38, which hub portion is supported in the center of a circular opening 40 in the upper portion of the right-hand housing section 14 by spokes 42. The upper portion of the left-hand housing section 12 is also provided with a matching opening 40a having a hub portion 38a and spokes 42a.

The lower wheel 22 is fixed on one end of a shaft 44, which shaft is journaled in ball bearings 46 supported in the side wall of the lower portion of housing section 14. Fixed on the other end of rotating shaft 44 and exteriorly of the casing is a V-pulley 48 adapted to be driven by a motor through a V-belt.

The wall portions 50 and 52 of the upper housing portion 28 surrounding the upper wheel 20 diverge in a clockwise direction with respect to the axis of wheel 20 to form, respectively, a relatively long, upper volute 54 discharging vertically downward at 56 toward the work area and a relatively short volute 58 discharging leftward into the vertical, hollow, connecting housing portion 32, see FIG. 2.

The wheels 20 and 22 have rim portions 60 in contact with the saw band 24 and central hub portions 62 supported by flat spokes 64. The outer portions of spokes 64 are considerably wider than the rims 60 and form radial vanes 66 which act to move radially outward from the central portions of the wheels.

The wall portion of the lower housing portion 30 surrounding the lower wheel 22 diverges clockwise with respect to the axis of wheel 22 to form a volute 68 discharging rearwardly of the housing through an outlet fitting 70, the fitting 70 being suitably adapted for attachment of a conduit or container.

There is a break in the peripheral wall of the lower housing portion 30, and straight side wall portions 72 and a tangential wall portion 74 extending upwardly therefrom form an inlet passage 76 leading from the work area above to the interior of the lower housing portion 30, see FIG. 2. A baffle consisting of right and left-hand sections 78 and 78a encloses that peripheral portion of the lower wheel 22, coinciding with the break in the peripheral wall of the lower housing portion. But the baffle 78—78a is narrower than the distance between the side walls of the lower housing portion and is centrally positioned between the side walls, see FIG. 4, so that air from the work area above may flow to the central portion of the lower housing portion and be thrown radially outward to the volute 68 by the wheel vanes 66.

The sections 78 and 78a, see FIGS. 5 and 6, have matching arcuate wall portions 80, each having a notch 82 therein which together provide an opening for the saw band to pass through. The sections 78 and 78a also have opposed side walls 84 formed at 90° to their arcuate wall portions, which side walls are attached to bosses 87 formed at the ends of ribs 86 and 88. The ribs 86 and 88 are formed as part of the housing side walls and extend inward from both side walls, thereby spacing the opposed side walls 84 of the baffles from the side walls of the housing. This provides inlet passage means leading around both sides of a peripheral portion of lower wheel 22.

The volute in the lower housing portion 30 is provided with a cutoff at 90 formed by internal ribs on the left and right-hand housing sections 12 and 14; however, there is a break extending upward from the cutoff 90 to the start of the volute at 92 which permits passage of the saw band 24. While this break may be reduced to a considerable degree by baffle means, there still must remain an opening for the saw band through which some sawdust may be thrown upward through the hollow connecting housing portion 32 by the lower wheel 22, which sawdust may in turn be picked up by the upper wheel 20 and discharged downward through the volute outlet 56. Also, some sawdust may be carried upward on the saw band to be discharged downward toward the work area. This is, of course, highly objectional and the provision of the short volute 58 in the upper housing portion 28 substantially precludes the movement of sawdust upwardly through the hollow connecting housing portion 32. The volute 58 provides a downward flow sufficient to counter and overcome any upward flow generated at the break by the lower wheel and, moreover, acts to blow off loose sawdust carried by the saw band.

OPERATION

In operation, the wheels 20 and 22 rotate in a clockwise direction. Sawdust from the work is carried downward through the opening 94 in the worktable by the saw and by the flow of air to the central portion of the lower housing portion 30, as indicated by directional arrows in FIGS. 2 and 4. From the central portion of the lower housing portion 30, air and sawdust are thrown radially outwardly by vanes 66 of wheel 22 into the volute 68 formed in part by the arcuate wall portions of baffle sections 78 and 78a and in part by the peripheral wall of the housing portion. The air flow and sawdust are thence directed outward from the housing through outlet fitting 70.

A portion of the air drawn inward through circular inlets 40 and 40a in the side walls of upper housing portion 28 is thrown outward by the vanes 66 of upper wheel 20 and thence directed downward through the outlet 56 of volute 54 toward the work area, thereby to blow sawdust from the surface of the work so that the cutting line is not obscured. Another portion of the air entering these inlets is directed downward by volute 58 through the hollow connecting housing portion 32 to counter any upward flow through the saw band access opening generated by the lower wheel 22.

It will be understood that air flow generated by the upper and lower wheels may be increased or decreased by varying the size and shape and/or positions of the vanes 66 and by restriction of inlets and/or outlets leading to and from the volutes. The outlet 56, for example, may be restricted and extended downward to focus air flow more directly on the work surface. Also, the downward flow through the hollow connecting housing portion 32 may be varied with respect to the flow through volute outlet 56 by changing the configuration of volute 58 or simply by placing a restriction in the hollow connecting housing portion.

Referring to FIG. 2 of the drawings, it will be noted that some air and sawdust will flow downward directly into the volute 68, as indicated by directional arrows, to be entrained with air and sawdust which has entered the central portion of the housing around baffles 78-78a and been thrown outward by the vanes 66. This flow directly into the volute 68 from the work area and positioning of the rib 88 inward radially from the rim of the lower wheels tends to reduce the velocity through outlet 70, which with some disposal arrangements may be desirable. If, however, it is desired to increase the velocity through outlet 70, either the arcuate portions of ribs 88-88a may be made coincident with the adjacent arcuate portion of the lower wheel rim and the straight portions tangental thereto, or the flow from the work area directly into the volute 68 may be blocked at the lower end of the baffles 78-78a, or both of these alterations may be made, to effect an increase in velocity through outlet 70.

From the foregoing, it will be seen that I have provided a simple and inexpensive means for blowing sawdust from the work surface in a band saw and for withdrawing sawdust from the work area and discharging it from the housing at a remote point.

The description and drawings setting forth a preferred form of my invention are intended to be illustrative, not limiting, the scope of my invention being set forth in the appended claims.

I claim:

1. In a band saw having an endless saw band extending over a pair of vertically spaced wheels mounted for rotation on a frame and a worktable supported on the frame having a work area through which the downward run of the saw band passes; the improvement which comprises circularly spaced radial vanes on the lower wheel, a volute form housing enclosing the lower wheel with an outlet remote from the work area, said housing having a spiral peripheral wall and opposite side walls and being wider than said lower wheel, and an inlet passage means leading from the work area to a central portion of said housing whereby air and sawdust are withdrawn from said work area and ejected through said outlet, said inlet passage means including an elongated opening in said peripheral housing wall, and an interior wall extending inwardly from said elongated opening along one side of said wheel and forming with one of said housing side walls an inlet passageway extending inwardly from said elongated opening toward a central portion of said housing.

2. A band saw as claimed in claim 1 in which said inlet passage means includes an elongated opening in said peripheral housing wall wider than said wheel, a baffle having a curved portion narrower than said elongated opening extending longitudinally across said elongated opening and including a wall portion extending inwardly on each side of said wheel, and said curved wall portion having a small opening therein to permit passage of the saw band therethrough.

3. A band saw as claimed in claim 1 in which said inlet passage means further comprises straight wall portions of said housing forming a passageway leading from said work area to said elongated opening in the peripheral wall of said housing.

4. A band saw having an endless saw band extending over rim portions of a pair of vertically spaced wheels enclosed and mounted for rotation in a housing and a worktable supported on the housing having a work area above and adjacent the lower wheel through which the downward run of the saw band passes; the improvement which comprises a housing portion enclosing the upper wheel as a volute casing with a spiral peripheral wall surrounding the saw band and with an outlet directed downward toward the work area, circularly spaced radial vanes on the upper wheel, and a central opening in a side wall of said casing to admit ambient air to a central portion of said casing thereby to direct a stream of air toward the work area.

5. In a band saw having a saw band extending over rim portions of a pair of vertically spaced wheels enclosed and mounted for rotation in upper and lower portions of a housing, which housing portions are connected by a hollow vertical portion enclosing the upward run of the saw band and in which a worktable supported by said housing above and adjacent the lower wheel includes a work area through which the downward run of the saw band passes; the improvement which comprises an upper housing portion enclosing the upper wheel formed as a volute casing with an outlet directed downward toward the work area, circularly spaced radial vanes on the upper wheel, a central opening in a side wall of the casing to admit ambient air to the central portion thereof thereby to direct a stream of air toward the work area a, lower housing portion enclosing the lower wheel formed as a volute casing with an outlet remote from the work area, circularly spaced radial vanes on the lower wheel, a cutoff baffle at the lower end of the hollow, vertical, connecting housing portion, and inlet passage means leading from the work area to a central interior portion of the lower volute casing thereby to withdraw air and saw dust from the work area and eject it from the housing through said remote outlet.

6. The band saw claimed in claim 5 in which said upper housing portion is formed as a volute casing having two consecutively extending volute passages diverging in the said direction, one of which volute passages has an outlet discharging downward toward the work area and the other of which has an outlet discharging downward through said hollow, vertical, connecting housing portion thereby to counter any upward flow of air or sawdust effected by rotation of the lower wheel or by the saw band.

7. A band saw as claimed in claim 5 in which said housing comprises two substantially symmetrical left and right-hand sections detachably connected along a vertical line, in which said housing is wider than said lower wheel and its vanes, and in which internal ribs form a cutoff at the outlet of the lower volute casing and form a portion of the inlet passageway means leading from the work area to the lower volute casing.

* * * * *